United States Patent
Low et al.

(10) Patent No.: US 10,488,046 B2
(45) Date of Patent: Nov. 26, 2019

(54) GAS TURBINE ENGINE COMBUSTOR BULKHEAD ASSEMBLY

(71) Applicant: United Technologies Corporation, Hartford, CT (US)

(72) Inventors: Kevin J. Low, Portland, CT (US); Nurhak Erbas-Sen, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 483 days.

(21) Appl. No.: 14/908,830

(22) PCT Filed: Aug. 13, 2014

(86) PCT No.: PCT/US2014/050912
§ 371 (c)(1),
(2) Date: Jan. 29, 2016

(87) PCT Pub. No.: WO2015/023764
PCT Pub. Date: Feb. 19, 2015

(65) Prior Publication Data
US 2016/0169516 A1      Jun. 16, 2016

Related U.S. Application Data
(60) Provisional application No. 61/866,848, filed on Aug. 16, 2013.

(51) Int. Cl.
*F23R 3/00*     (2006.01)
*F23R 3/10*     (2006.01)
(Continued)

(52) U.S. Cl.
CPC .............. *F23R 3/06* (2013.01); *F02C 7/18* (2013.01); *F23R 3/002* (2013.01); *F23R 3/12* (2013.01);
(Continued)

(58) Field of Classification Search
CPC .... F23R 3/02; F23R 3/002; F23R 3/06; F23R 3/10; F23R 3/60; F02C 7/22; F02C 3/14
See application file for complete search history.

(56) References Cited

U.S. PATENT DOCUMENTS 2,974,485 A * 3/1961 Schiefer .................. F23C 99/00
                                                              60/756
4,085,581 A * 4/1978 Caruel .................... F23R 3/002
                                                              60/738

(Continued)

OTHER PUBLICATIONS

EP search report for EP14836240.3 dated Jul. 20, 2016.
International Search Report dated Nov. 13, 2014 for International Application No. PCT/US2014/050912.

Primary Examiner — Todd E Manahan
Assistant Examiner — Eric W Linderman
(74) Attorney, Agent, or Firm — O'Shea Getz P.C.

(57) ABSTRACT

A bulkhead assembly for a combustor of a gas turbine engine includes a bulkhead support shell with a multiple of swirler openings. Each of the multiple of swirler openings is surrounded by a first multiple of cooling impingement passages that define an angle α with respect to a hot side of the bulkhead support shell and a second multiple of cooling impingement passages that define an angle β with respect to the hot side of the bulkhead support shell. The angle α is different than the angle β.

14 Claims, 11 Drawing Sheets

(51) Int. Cl.
*F23R 3/06* (2006.01)
*F23R 3/12* (2006.01)
*F23R 3/60* (2006.01)
*F02C 7/18* (2006.01)
*F23R 3/50* (2006.01)
*F23R 3/02* (2006.01)
*F02C 3/14* (2006.01)

(52) U.S. Cl.
CPC .................. *F23R 3/50* (2013.01); *F23R 3/60* (2013.01); *F02C 3/14* (2013.01); *F05D 2260/201* (2013.01); *F23R 3/02* (2013.01); *F23R 3/10* (2013.01); *F23R 2900/03042* (2013.01); *F23R 2900/03044* (2013.01); *Y02T 50/675* (2013.01)

(56) References Cited

U.S. PATENT DOCUMENTS

| | | | | |
|---|---|---|---|---|
| 5,129,231 A * | 7/1992 | Becker | | F23R 3/10 60/754 |
| 5,271,219 A | 12/1993 | Richardson | | |
| 5,307,637 A * | 5/1994 | Stickles | | F23R 3/002 60/756 |
| 5,357,745 A * | 10/1994 | Probert | | F23R 3/10 60/39.37 |
| 5,396,759 A * | 3/1995 | Richardson | | F23R 3/002 60/756 |
| 5,419,115 A | 5/1995 | Butler et al. | | |
| 5,490,389 A * | 2/1996 | Harrison | | F23R 3/10 60/737 |
| 5,509,270 A * | 4/1996 | Pearce | | F23R 3/10 60/740 |
| 5,623,827 A * | 4/1997 | Monty | | F23R 3/10 60/747 |
| 5,918,467 A * | 7/1999 | Kwan | | F23R 3/10 60/752 |
| 5,956,955 A * | 9/1999 | Schmid | | F23R 3/283 60/748 |
| 6,155,056 A * | 12/2000 | Sampath | | F23R 3/002 60/756 |
| 7,093,439 B2 * | 8/2006 | Pacheco-Tougas | | F23R 3/002 60/752 |
| 7,363,763 B2 * | 4/2008 | Coughlan, III | | F23R 3/002 60/752 |
| 7,721,548 B2 * | 5/2010 | Patel | | F23R 3/10 60/752 |
| 7,748,221 B2 * | 7/2010 | Patel | | F23R 3/10 60/752 |
| 7,770,397 B2 * | 8/2010 | Patel | | F01D 25/12 60/752 |
| 7,845,174 B2 | 12/2010 | Parkman | | |
| 7,861,530 B2 | 1/2011 | Hawie | | |
| 7,926,280 B2 | 4/2011 | Morenko | | |
| 7,934,382 B2 | 5/2011 | Burd | | |
| 7,954,325 B2 | 6/2011 | Burd | | |
| 8,015,829 B2 | 9/2011 | Couglan | | |
| 8,020,366 B2 | 9/2011 | Cowan | | |
| 8,028,528 B2 | 10/2011 | Burd | | |
| 8,056,342 B2 | 11/2011 | Shelley | | |
| 8,171,736 B2 | 5/2012 | Hawie | | |
| 8,186,164 B2 | 5/2012 | Cowan | | |
| 8,266,914 B2 | 9/2012 | Hawie | | |
| 8,418,470 B2 | 4/2013 | Burd | | |
| 8,443,610 B2 | 5/2013 | Hoke | | |
| 8,479,521 B2 | 7/2013 | Hoke | | |
| 9,625,152 B2 * | 4/2017 | Papple | | F23R 3/10 |
| 2002/0116929 A1 * | 8/2002 | Snyder | | F23R 3/002 60/740 |
| 2002/0178734 A1 * | 12/2002 | Stastny | | F23R 3/283 60/796 |
| 2003/0000217 A1 * | 1/2003 | North | | F23R 3/002 60/772 |
| 2003/0213249 A1 * | 11/2003 | Pacheco-Tougas | | F23R 3/002 60/752 |
| 2004/0083735 A1 * | 5/2004 | Borns | | F23R 3/10 60/772 |
| 2005/0138931 A1 | 6/2005 | Pacheco-Tougas et al. | | |
| 2006/0059916 A1 * | 3/2006 | Cheung | | F23R 3/00 60/752 |
| 2006/0196188 A1 * | 9/2006 | Burd | | F23R 3/002 60/754 |
| 2006/0272335 A1 * | 12/2006 | Schumacher | | F23R 3/12 60/804 |
| 2008/0000234 A1 * | 1/2008 | Commaret | | F23D 11/107 60/748 |
| 2008/0092546 A1 * | 4/2008 | Stastny | | F23R 3/002 60/752 |
| 2008/0104962 A1 | 5/2008 | Patel et al. | | |
| 2008/0115506 A1 * | 5/2008 | Patel | | F02C 3/145 60/804 |
| 2008/0178599 A1 * | 7/2008 | Hawie | | F23R 3/10 60/752 |
| 2009/0145137 A1 | 6/2009 | Rizkalla | | |
| 2011/0185739 A1 | 8/2011 | Bronson et al. | | |
| 2013/0025288 A1 * | 1/2013 | Cunha | | F23R 3/002 60/772 |
| 2013/0192233 A1 * | 8/2013 | Eastwood | | F23R 3/002 60/752 |
| 2014/0102106 A1 * | 4/2014 | Snyder | | F23R 3/04 60/752 |
| 2014/0216044 A1 * | 8/2014 | Erbas-Sen | | F23R 3/002 60/772 |
| 2015/0362191 A1 * | 12/2015 | Papple | | F23R 3/04 60/772 |
| 2016/0245521 A1 * | 8/2016 | Moura, III | | F02C 3/00 |
| 2017/0248078 A1 * | 8/2017 | Hannwacker | | F02C 7/18 |

* cited by examiner

GAS TURBINE ENGINE COMBUSTOR BULKHEAD ASSEMBLY

CROSS-REFERENCE TO RELATED APPLICATION

This application claims priority to PCT Patent Application No. PCT/US2014/050912 filed Aug. 13, 2014, which claims priority to U.S. Patent Application No. 61/866,848 filed Aug. 16, 2013, which is hereby incorporated by reference in its entirety.

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Among the engine sections, relatively significant temperatures are observed in the combustor section such that cooling may be required to obtain desired life requirements. In the combustor section, the two main heat transfer mechanisms from hot combustion gases to the combustor walls are convection and radiation. Radiation is mainly a bulk phenomenon driven by the chemical composition of the fuel, engine performance parameters such as compressor section exit temperatures and pressures, and the overall fuel-air mixture. Convection is a relatively more local phenomenon that is a function of the momentum characteristics of the combustion gases that are highly affected by the uniformity (or non-uniformity) of the fuel-air mixture since the local reacting characteristics may change, especially near the wall, where the combustion gases interact with the cooling airflows.

SUMMARY

A bulkhead assembly for a combustor of a gas turbine engine, according to one disclosed non-limiting embodiment of the present disclosure, includes a bulkhead support shell with a multiple of swirler openings. Each of the multiple of swirler openings is surrounded by a first multiple of cooling impingement passages that define an angle $\alpha$ with respect to a hot side of the bulkhead support shell and a second multiple of cooling impingement passages that define an angle $\beta$ with respect to the hot side of the bulkhead support shell. The angle $\alpha$ is different than the angle $\beta$.

In a further embodiment of the present disclosure, the angle $\alpha$ is ninety degrees with respect to the hot side of the bulkhead support shell.

In a further embodiment of any of the foregoing embodiments of the present disclosure, the angle $\beta$ is not ninety degrees with respect to the hot side of the bulkhead support shell.

In a further embodiment of any of the foregoing embodiments of the present disclosure, the first multiple of cooling impingement passages and the second multiple of cooling impingement passages define a ring around each of the multiple of swirler openings.

In a further embodiment of any of the foregoing embodiments of the present disclosure, at least one of the first multiple of cooling impingement passages alternate with every one of the second multiple of cooling impingement passages.

In a further embodiment of any of the foregoing embodiments of the present disclosure, every one of the first multiple of cooling impingement passages alternate with at least one of the second multiple of cooling impingement passages.

In a further embodiment of any of the foregoing embodiments of the present disclosure, every one of the first multiple of cooling impingement passages alternate with every one of the second multiple of cooling impingement passages.

In a further embodiment of any of the foregoing embodiments of the present disclosure, a multiple of bulkhead liner panels are mounted to the bulkhead support shell. Each of the multiple of bulkhead liner panels includes a circular rail that interfaces with the bulkhead support shell around the each of the multiple of swirler openings to define an inner corner. At least one of the second multiple of cooling impingement passages is directed toward the inner corner.

In a further embodiment of any of the foregoing embodiments of the present disclosure, a mid-rail is included that interfaces with the circular rail. At least one of the second multiple of cooling impingement passages is directed toward the inner corner from each side of the mid-rail.

A bulkhead assembly for a combustor of a gas turbine engine, according to another disclosed non-limiting embodiment of the present disclosure, includes a bulkhead support shell with a multiple of swirler openings. Each of the multiple of swirler openings is surrounded by a first multiple of cooling impingement passages and a second multiple of cooling impingement passages. The bulkhead assembly also includes a multiple of bulkhead liner panels mounted to the bulkhead support shell. Each of the multiple of bulkhead liner panels includes a circular rail that interfaces with the bulkhead support shell around each of the multiple of swirler openings to define an inner corner. At least one of the second multiple of cooling impingement passages is directed toward the inner corner.

In a further embodiment of any of the foregoing embodiments of the present disclosure, the first multiple of cooling impingement passages define an angle $\alpha$ with respect to a hot side of the bulkhead support shell and the second multiple of cooling impingement passages that define an angle $\beta$ with respect to the hot side of the bulkhead support shell. The angle $\alpha$ is different than the angle $\beta$.

In a further embodiment of any of the foregoing embodiments of the present disclosure, the angle $\alpha$ is ninety degrees with respect to the hot side of the bulkhead support shell and the angle $\beta$ not ninety degrees with respect to the hot side of the bulkhead support shell.

In a further embodiment of any of the foregoing embodiments of the present disclosure, the first multiple of cooling impingement passages and the second multiple of cooling impingement passages define a ring around each of the multiple of swirler openings.

In a further embodiment of any of the foregoing embodiments of the present disclosure, at least one of the first multiple of cooling impingement passages alternate with every one of the second multiple of cooling impingement passages.

In a further embodiment of any of the foregoing embodiments of the present disclosure, every one of the first multiple of cooling impingement passages alternate with at least one of the second multiple of cooling impingement passages.

In a further embodiment of any of the foregoing embodiments of the present disclosure, every one of the first multiple of cooling impingement passages alternate with every one of the second multiple of cooling impingement passages.

In a further embodiment of any of the foregoing embodiments of the present disclosure, a mid-rail is included that interfaces with the circular rail. At least one of the second multiple of cooling impingement passages is directed toward the inner corner from each side of the mid-rail.

A method of cooling bulkhead assembly for a combustor of a gas turbine engine, according to another disclosed non-limiting embodiment of the present disclosure, includes directing cooling air through a bulkhead support shell to impinge upon an inner corner of a circular rail on a bulkhead liner panel that interfaces with the bulkhead support shell.

In a further embodiment of any of the foregoing embodiments of the present disclosure, the method includes directing a portion of the cooling air at an angle through the bulkhead support shell.

In a further embodiment of any of the foregoing embodiments of the present disclosure, the method includes directing a portion of the cooling air normal to the bulkhead liner panel.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
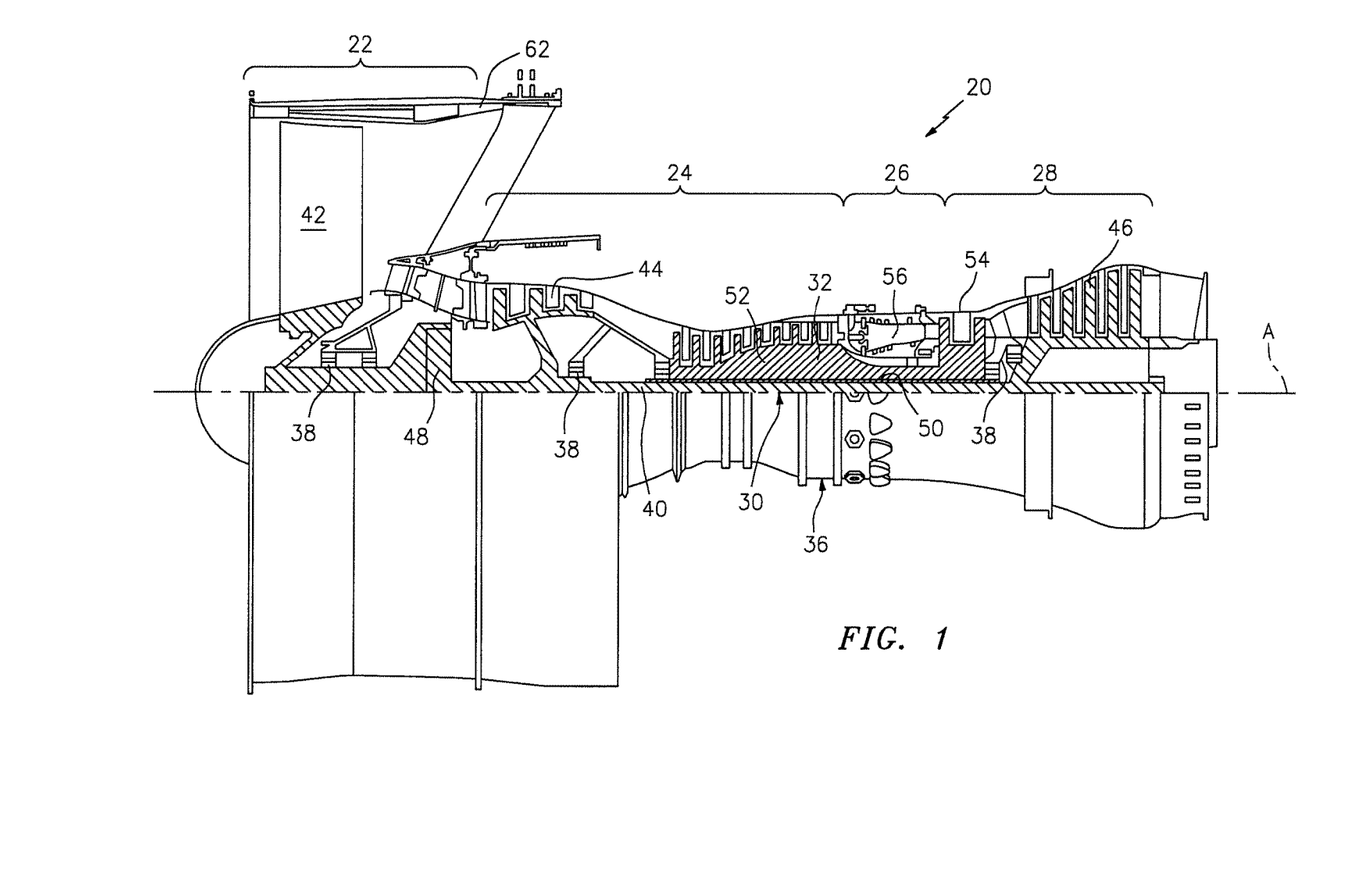
FIG. 1 is a schematic cross-section of an example gas turbine engine architecture.
Figure 2:
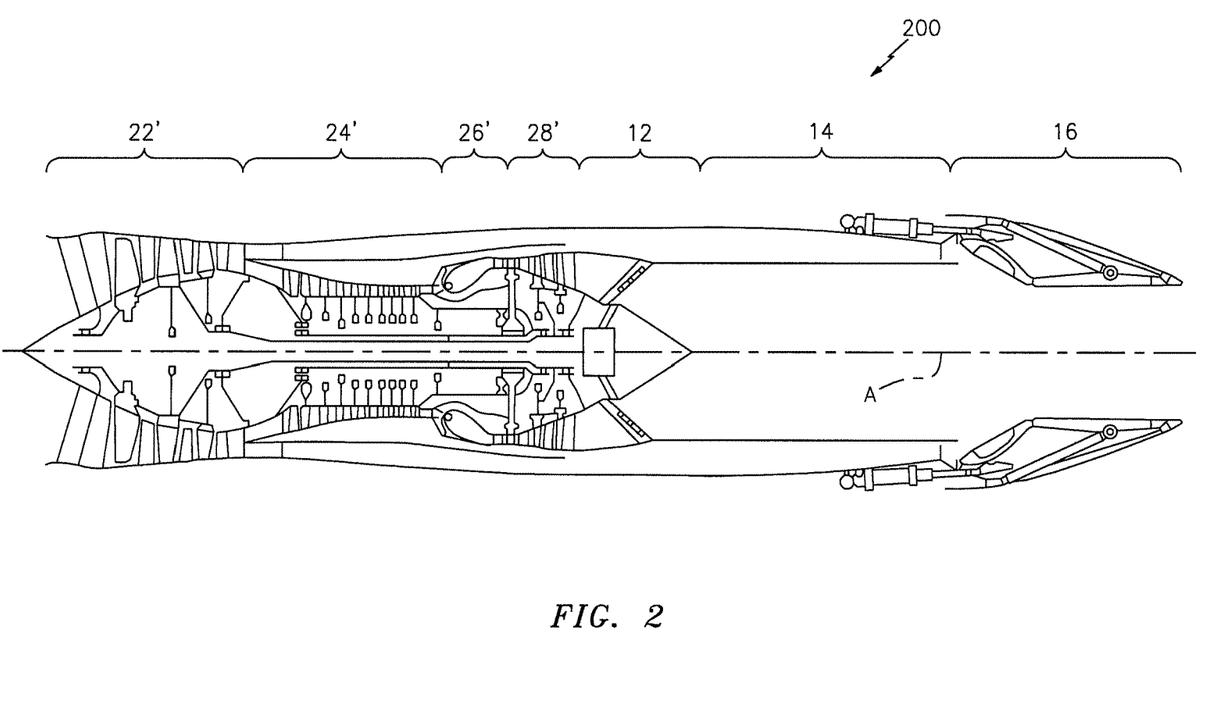
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 200 might include an augmentor section 12, an exhaust duct section 14 and a nozzle section 16 in addition to the fan section 22', compressor section 24', combustor section 26' and turbine section 28' (see FIG. 2) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an Intermediate Pressure Turbine ("IPT") between a high pressure turbine ("HPT") and a Low Pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly (see FIG. 2) or through a geared architecture 48 (see FIG. 1) to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 46, 54 rotationally drive the respective low spool 30 and high spool 32 in response to the expansion. The main engine shafts 40, 50 are supported at a plurality of points by the bearing structures 38 within the static structure 36. It should be understood that various bearing structures 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 3:
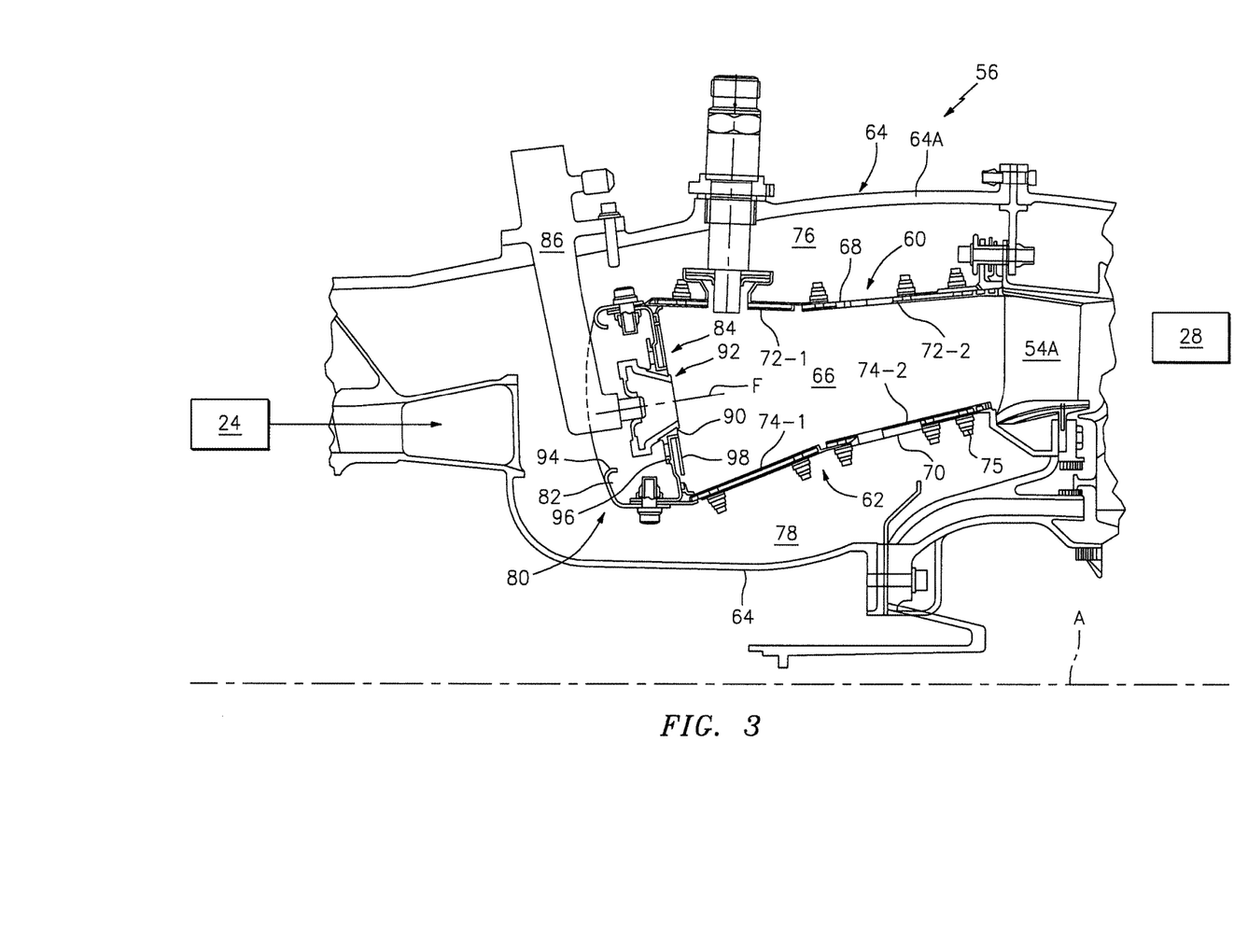
FIG. 3 is an expanded longitudinal schematic sectional view of a combustor section according to one non-limiting embodiment that may be used with the example gas turbine engine architectures shown in FIGS. 1 and 2.

With reference to FIG. 3, the combustor section 26 generally includes a combustor 56 with an outer combustor wall 60, an inner combustor wall 62 and a diffuser case module 64. The outer combustor wall assembly 60 and the inner combustor wall 62 are spaced apart such that a combustion chamber 66 is defined therebetween. The combustion chamber 66 is generally annular in shape.

The outer combustor wall 60 is spaced radially inward from an outer diffuser case 64A of the diffuser case module 64 to define an outer annular plenum 76. The inner combustor wall 62 is spaced radially outward from an inner diffuser case 64B of the diffuser case module 64 to define an inner annular plenum 78. It should be understood that although a particular combustor is illustrated, other combustor types with various combustor liner arrangements will also benefit herefrom.

The combustor walls 60, 62 contain the combustion products for direction toward the turbine section 28. Each combustor wall 60, 62 generally includes a respective support shell 68, 70 which supports one or more liner panels 72, 74 mounted thereto. Each of the liner panels 72, 74 may be generally rectilinear and manufactured of, for example, a nickel based super alloy, ceramic or other temperature resistant material and are arranged to form a liner array. In one disclosed non-limiting embodiment, the liner array includes a multiple of forward liner panels 72-1 and a multiple of aft liner panels 72-2 that are circumferentially staggered to line the outer shell 68. A multiple of forward liner panels 74-1 and a multiple of aft liner panels 74-2 are circumferentially staggered to line the inner shell 70.

The combustor 56 further includes a forward assembly 80 immediately downstream of the compressor section 24 to receive compressed airflow therefrom. The forward assembly 80 generally includes an annular hood 82, a bulkhead assembly 84, and a multiple of swirlers 90 (one shown). Each of the swirlers 90 is circumferentially aligned with one of a multiple of fuel nozzles 86 (one shown) along an axis F.

The bulkhead assembly 84 generally includes a bulkhead support shell 96 secured to the combustor walls 60, 62, and a multiple of circumferentially distributed bulkhead liner panels 98 secured to the bulkhead support shell 96 around the swirler opening 92. The bulkhead support shell 96 is generally annular and the multiple of circumferentially distributed bulkhead liner panels 98 are segmented, typically one to each fuel nozzle 86 and swirler 90.

The annular hood 82 extends radially between, and is secured to, the forwardmost ends of the combustor walls 60, 62. The annular hood 82 includes the multiple of circumferentially distributed hood ports 94 that receive one of the respective multiple of fuel nozzles 86 to facilitate the direction of compressed air into the forward end of the combustion chamber 66 through the respective swirler 90. Each fuel nozzle 86 may be secured to the diffuser case module 64 and project through an associated hood port 94.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a fuel-air mixture that supports stable combustion in the combustion chamber 66.

Opposite the forward assembly 80, the outer and inner support shells 68, 70 are mounted adjacent a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation.

Figure 4:
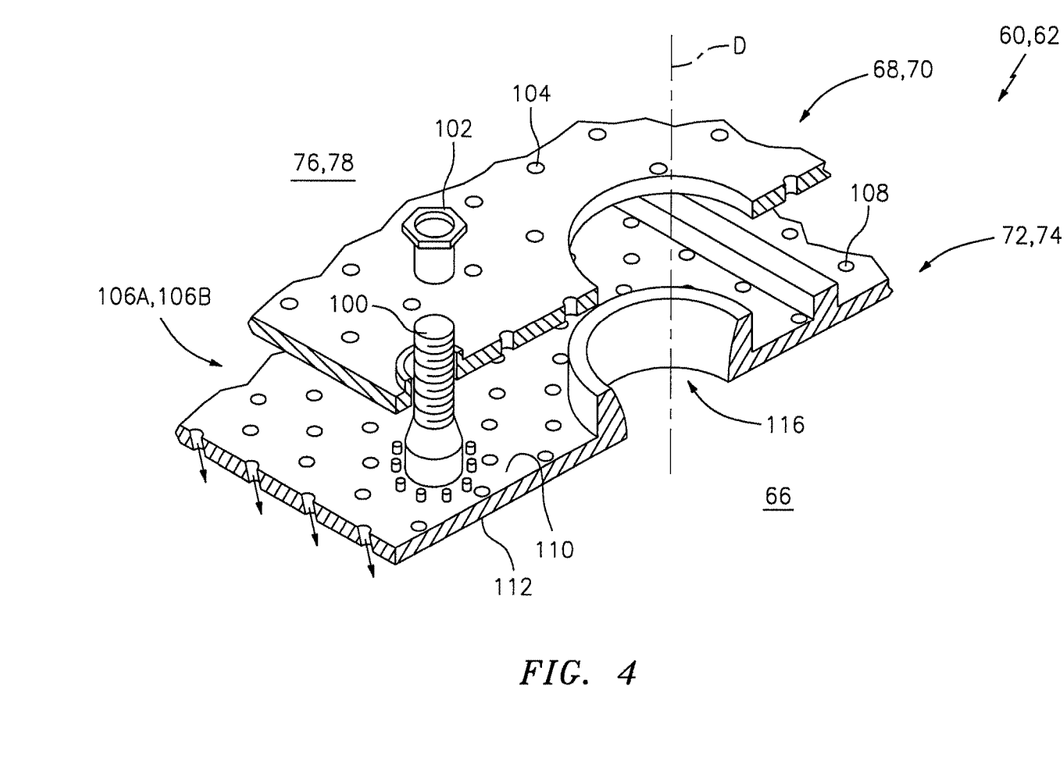
FIG. 4 is an exploded view of a liner assembly of the combustor.

With reference to FIG. 4, a multiple of studs 100 extend from the liner panels 72, 74 so as to permit the liner panels 72, 74 to be mounted to their respective support shells 68, 70 with fasteners 102 such as nuts. That is, the studs 100 project rigidly from the liner panels 72, 74 and through the respective support shells 68, 70 to receive the fasteners 102 at a threaded distal end section thereof.

A multiple of cooling impingement passages 104 penetrate through the support shells 68, 70 to allow air from the respective annular plenums 76, 78 to enter cavities 106A, 106B formed in the combustor walls 60, 62 between the respective support shells 68, 70 and liner panels 72, 74. The cooling impingement passages 104 are generally normal to the surface of the liner panels 72, 74. The air in the cavities 106A, 106B provides cold side impingement cooling of the liner panels 72, 74 that is generally defined herein as heat removal via internal convection.

A multiple of effusion passages 108 penetrate through each of the liner panels 72, 74. The geometry of the passages (e.g., diameter, shape, density, surface angle, incidence angle, etc.) as well as the location of the passages with respect to the high temperature main flow also contributes to effusion film cooling. Liner walls 60, 62 with combinations of impingement passages 104 and effusion passages 108 may be referred to as an Impingement Film Floatwall (IFF) assembly.

The effusion passages 108 allow the air to pass from the cavities 106A, 106B defined in part by a cold side 110 of the liner panels 72, 74 to a hot side 112 of the liner panels 72, 74 and thereby facilitate the formation of a relatively thin, cool, insulating blanket or film of cooling air along the hot side 112. The effusion passages 108 are generally more numerous than the impingement passages 104 to promote the development of film cooling along the hot side 112 to sheath the liner panels 72, 74. Film cooling as defined herein is the introduction of a relatively cooler air at one or more discrete locations along a surface exposed to a high temperature environment to protect that surface in the region of the air injection as well as downstream thereof.

A multiple of dilution passages 116 may penetrate through both the respective support shells 68, 70 and liner panels 72, 74 along a common axis D. For example only the dilution passages 116 are located downstream of the forward assembly 80 to quench the hot combustion gases within the combustion chamber 66 by direct supply of cooling air from the respective annular plenums 76, 78.

Figure 5:
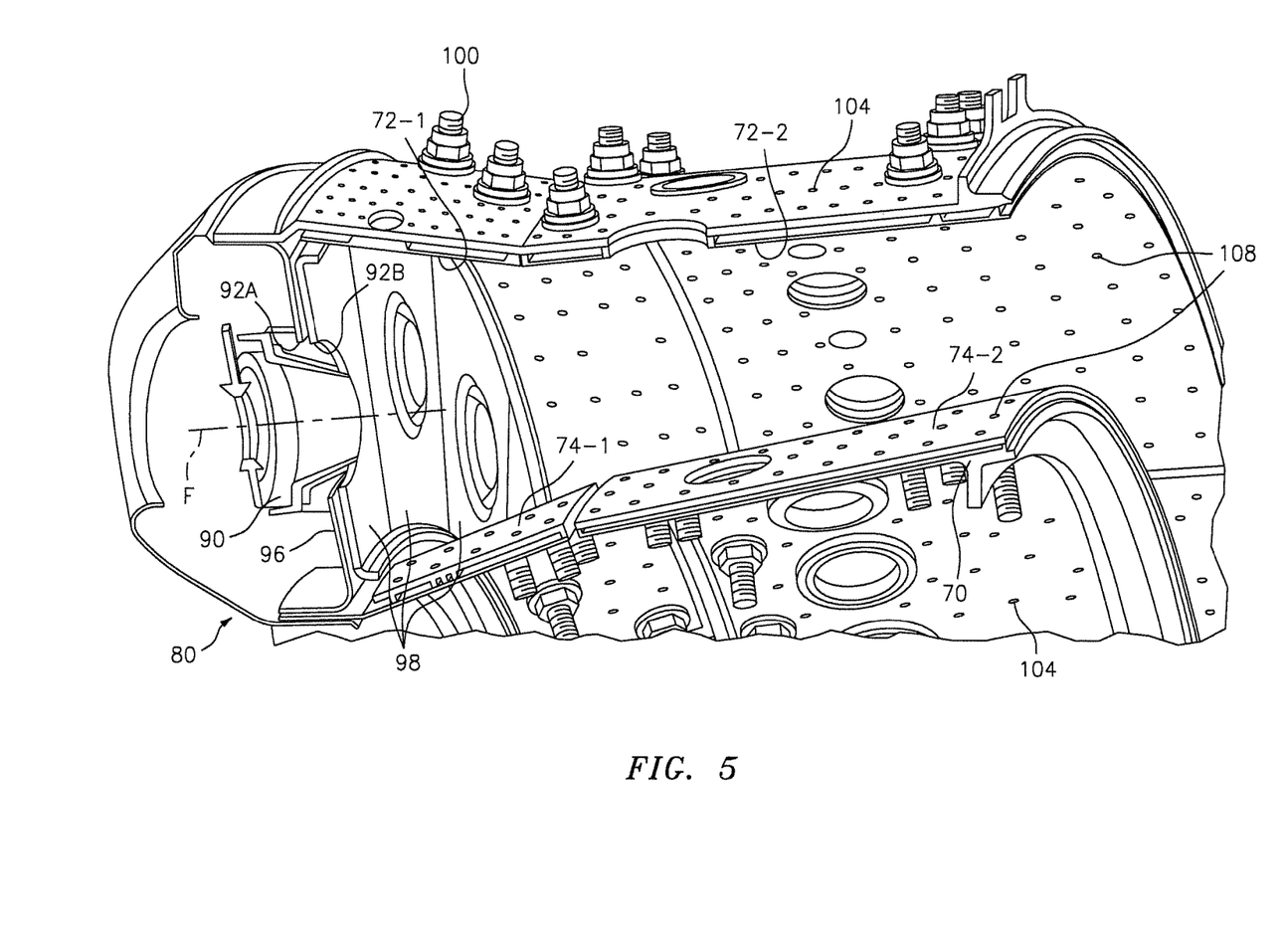
FIG. 5 is a perspective partial longitudinal sectional view of the combustor section.

With reference to FIG. 5, each of the bulkhead liner panels 98 are generally transverse to axis F while the liner panels 72, 74 are generally parallel thereto. A generally rectilinear longitudinal section of the annular combustion chamber 66 is thereby defined for each of the multiple of fuel nozzles 86.

Figure 6:
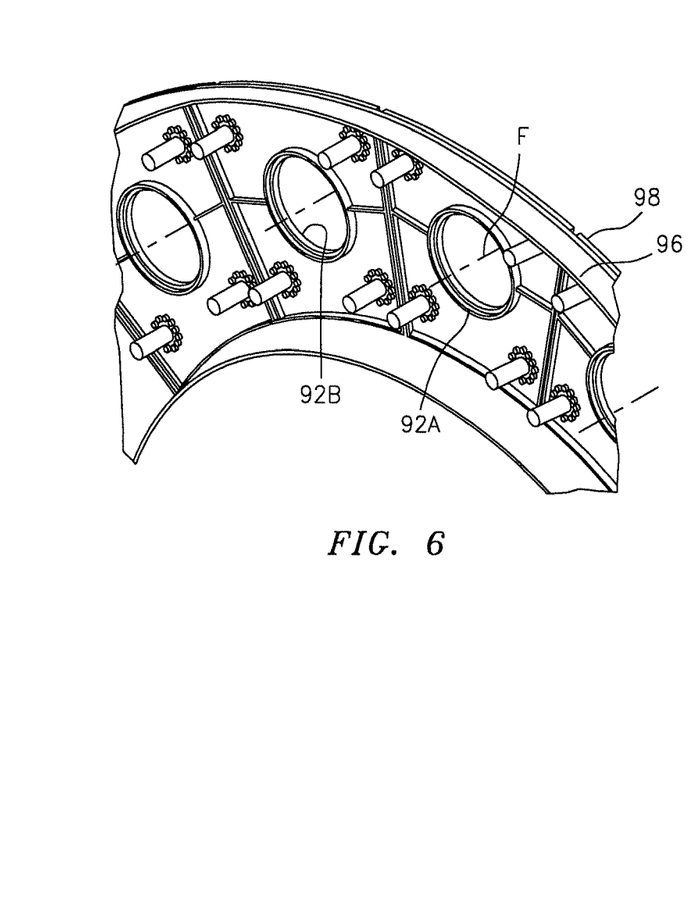
FIG. 6 is an expanded rear perspective view of a bulkhead assembly from a cold side.
Figure 7:
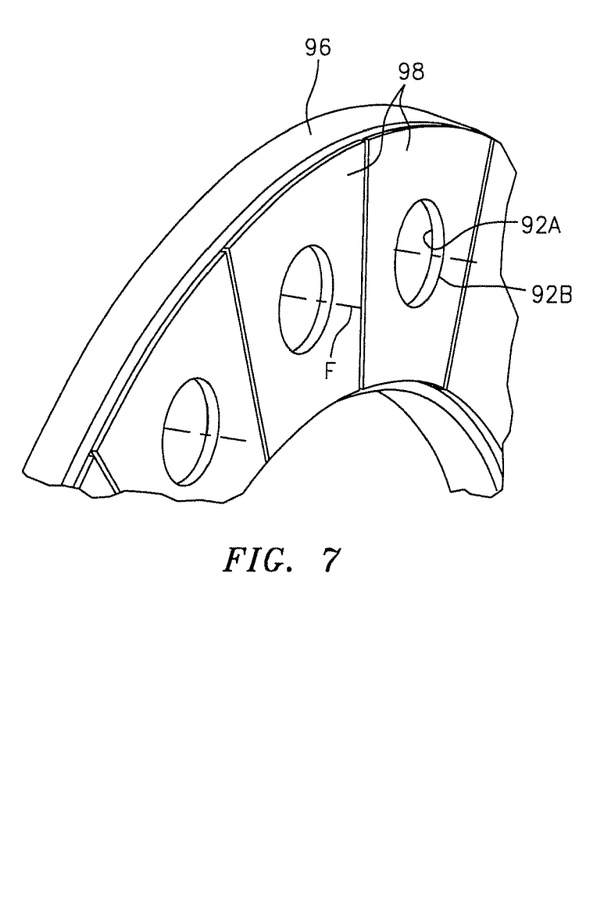
FIG. 7 is an expanded front perspective view of the bulkhead assembly from a hot side.

The bulkhead support shell 96 is generally annular and defines a multiple of swirler openings 92A (see FIG. 6), one each for each fuel nozzle 86/swirler 90 (see FIG. 3). A multiple of bulkhead liner panels 98 (see FIG. 7) are mounted to the bulkhead support shell 96. Each bulkhead liner panel 98 includes a respective swirler opening 92B that corresponds with the swirler opening 92A along a common axis F.

Figure 8:
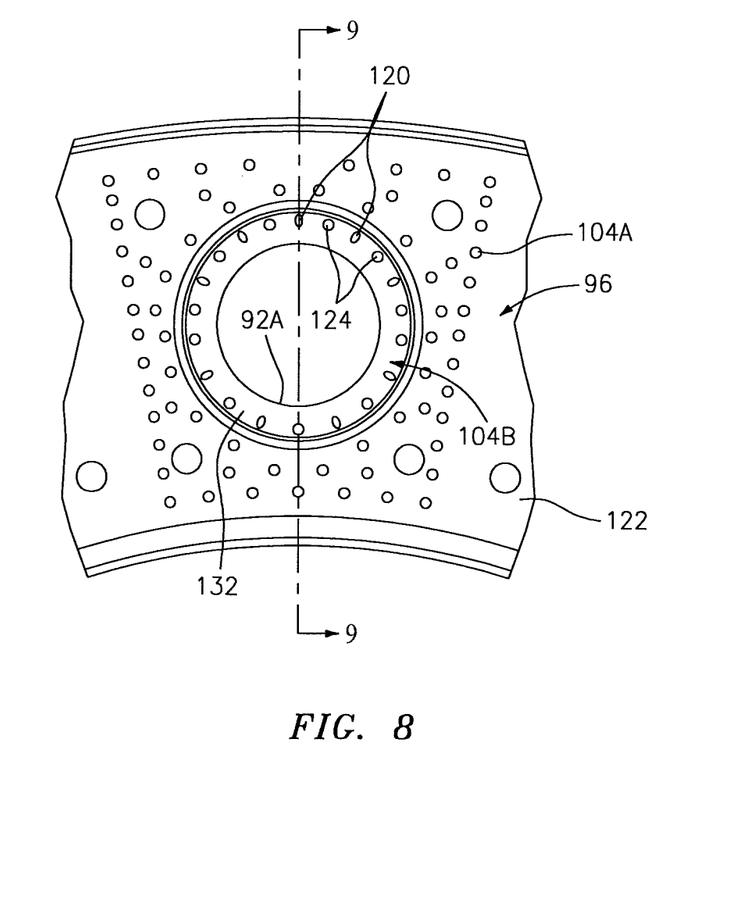
FIG. 8 is a front perspective view of a bulkhead support shell of the bulkhead assembly from a hot side.
Figure 9:
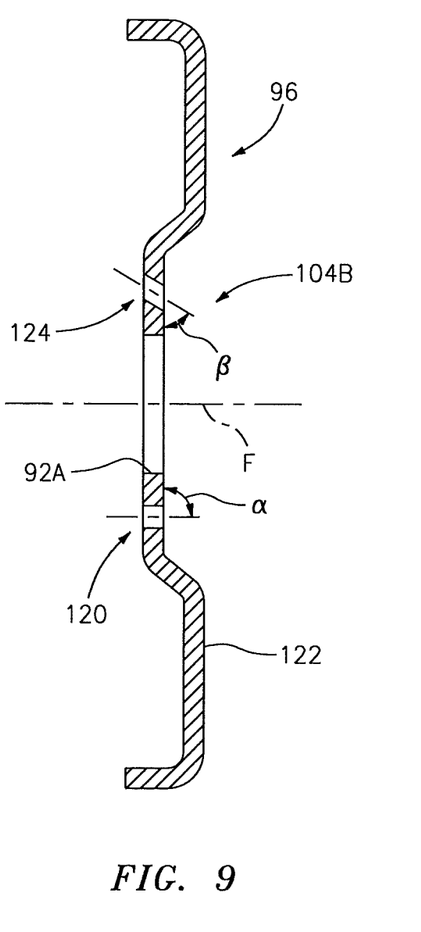
FIG. 9 is a sectional view of the bulkhead support shell taken along line 9-9 in FIG. 8.

With reference to FIGS. 8 and 9, the bulkhead support shell 96 includes a multiple of cooling impingement passages 104A that penetrate therethrough to provide cold side cooling for the multiple of bulkhead liner panels 98. In one disclosed non-limiting embodiment, a subset 104B of the multiple of cooling impingement passages 104A are located to form a ring about each swirler opening 92A. The subset 104B includes a first multiple of cooling impingement passages 120 that define an angle $\alpha$ with respect to a hot side 122 of the bulkhead support shell 96 and a second multiple of cooling impingement passages 124 to define an angle $\beta$ with respect to the hot side 122 of the bulkhead support shell 96 (see FIG. 9). In the disclosed non-limiting embodiment, each one of the first multiple of cooling impingement passages 120 are perpendicular with respect to the hot side 122 (angle $\alpha$ is 90 degrees) and form a sequence that alternates with each one of the second multiple of cooling impingement passages 124 which define a non-perpendicular angle with respect to the hot side 122 (angle $\beta$ is not 90 degrees). It should be appreciated that various other angles $\alpha$, $\beta$ as well as different sequences will also benefit herefrom. For example, two adjacent cooling impingement passages 124 may flank each side of the ninety degree and the two hundred seventy degree position.

Figure 10:
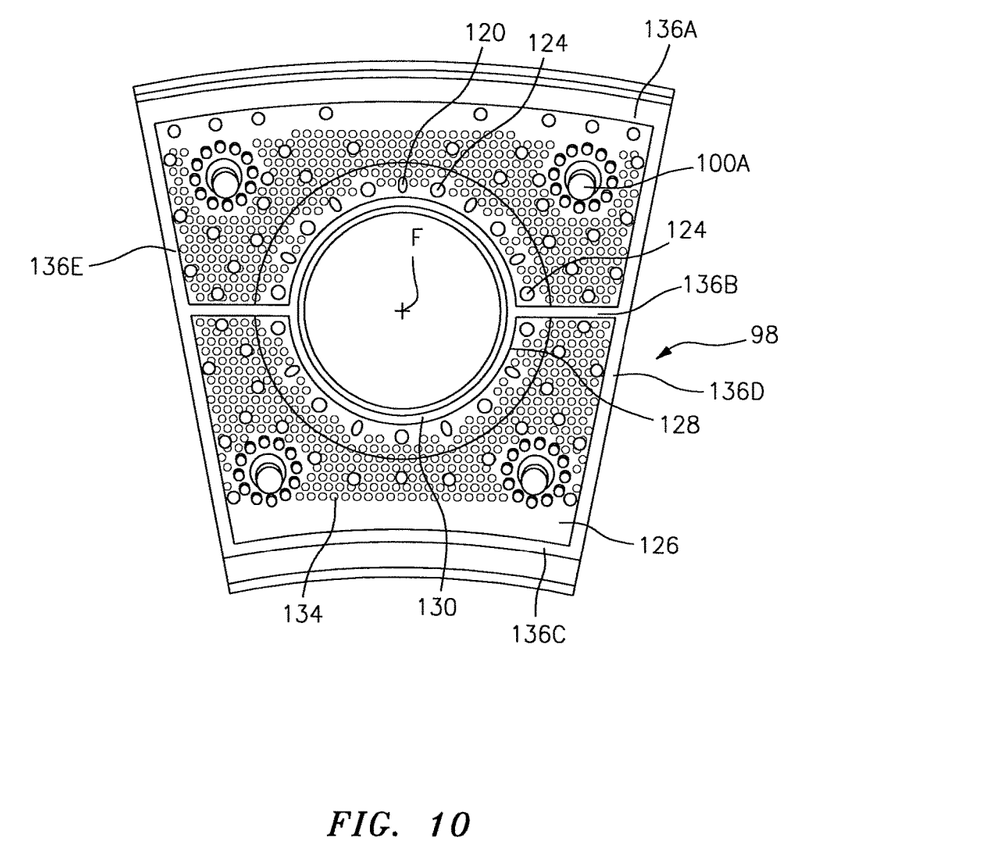
FIG. 10 is a rear perspective view of a bulkhead liner panel of the bulkhead assembly from a cold side illustrating cooling airflow impingement areas according to one disclosed non-limiting embodiment.
Figure 11:
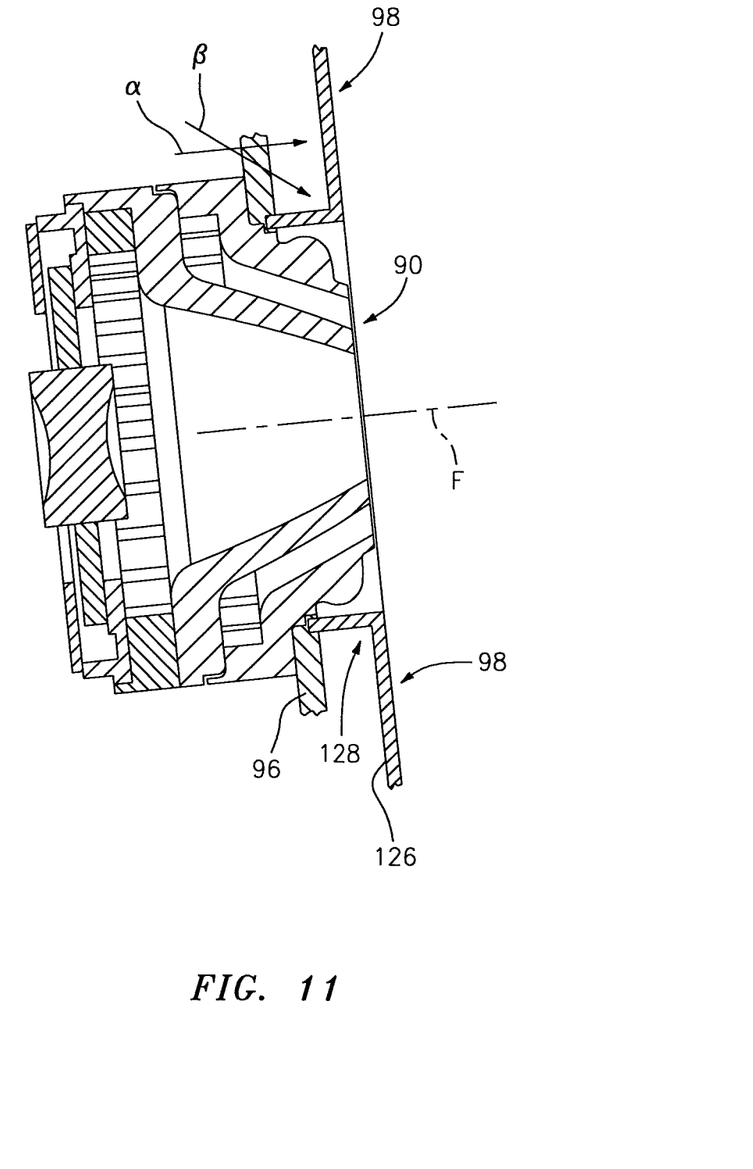
FIG. 11 is a longitudinal sectional view of the bulkhead assembly taken through one swirler.

With reference to FIG. 10, the first multiple of cooling impingement passages 120 deliver impingement cooling air normal to a cold side 126 of the bulkhead liner panels 98 to maximize heat removal from the of bulkhead liner panels 98 (see FIG. 11). The second multiple of cooling impingement passages 124 deliver impingement cooling air toward an inner corner 128 on the cold side 126 of the bulkhead liner panels 98. The inner corner 128 on the cold side 126 of the bulkhead liner panels 98 defines an inner circular rail 130 that interfaces with a circular recess 132 (see FIG. 8) in the bulkhead support shell 96 and/or the swirler 90. The angle $\beta$ directs the cooling air toward the inner corner 128 yet accommodates assembly of the bulkhead liner panels 98 to the bulkhead support shell 96 and/or the swirler 90 (see FIG. 11). The first multiple of cooling impingement passages 120 and the second multiple of cooling impingement passages 124 thereby facilitate effective cooling of the region around the fuel nozzle 86.

Referring still generally to FIG. 10, the cold side 126 of the bulkhead liner panels 98 may include numerous heat transfer features 134 such as pins which extend toward a hot side of the bulkhead support shell 96. A multiple of studs 100A extend from the bulkhead liner panels 98 so as to permit the bulkhead liner panels 98 to be mounted to the bulkhead support shell 96 (see FIG. 11). In one disclosed non-limiting embodiment, an outer rail 136A, a mid rail 136B and an inner rail 136C and edge rails 136D, 136E interface with the bulkhead support shell 96 to further compartmentalize the cooling airflow between the bulkhead liner panels 98 and the bulkhead support shell 96.

Figure 12:
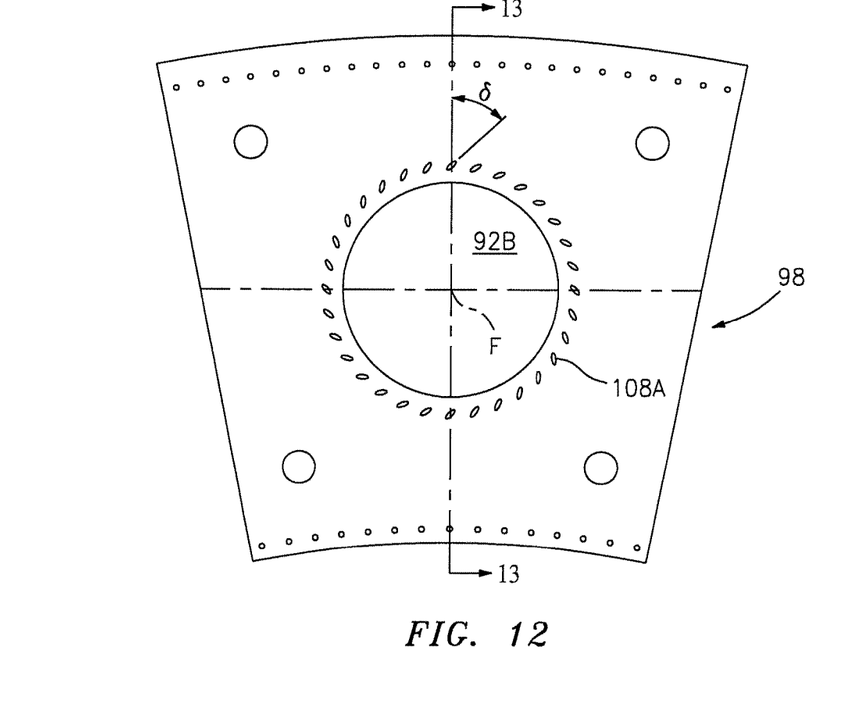
FIG. 12 is a front perspective view of a bulkhead liner panel of the bulkhead assembly from a hot side illustrating cooling passages according to one disclosed non-limiting embodiment.
Figure 13:
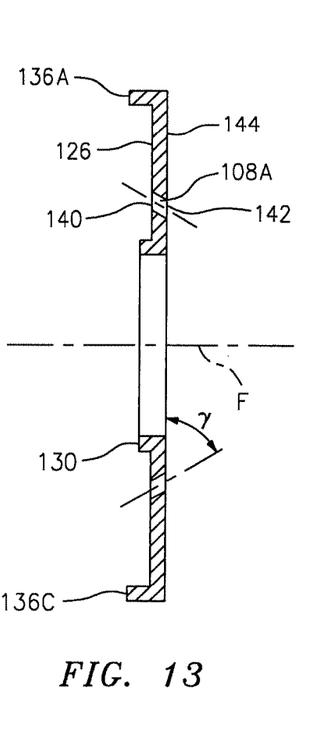
FIG. 13 is a sectional view of the bulkhead liner assembly taken along line 13-13 in FIG. 12.

With reference to FIGS. 12 and 13, after impinging on the cold side 126 of the bulkhead liner panels 98, the cooling air purges into the combustor chamber 66 through a multiple of effusion passages 108A which form a ring about each swirler opening 92B. Each of the effusion passages 108A include an entrance 140 on the cold side 126 of the bulkhead liner panels 98 and an exit 142 on a hot side 144 of the bulkhead liner panel 98. That is, each entrance 140 may be displaced from the respective exit 142 such that the effusion passage 108A defines a surface angle $\gamma$ through each the bulkhead liner panels 98 with respect to the cold side 126 and hot side 144 (see FIG. 13). That is, the angle $\gamma$ need not be perpendicular (angle $\gamma$ not ninety degrees) through the bulkhead liner panel 98.

In one disclosed non-liming embodiment the effusion passages 108A are also skewed at an angle $\delta$ with respect to the fuel nozzle axis F. The skew angle $\delta$ in this disclosed non-limiting embodiment are in the direction of the fuel air mixture as swirled by the swirler 90 to further the mixture. It should be appreciated that various other angles $\gamma$ and skew angles $\delta$ will also benefit herefrom. For example, the number of passages and the surface angle thereof may be readily tailored to address specific hot spot on the bulkhead liner panels 98. The impingement hole count on the bulkhead support shell 96 along with the effusion hole count on the bulkhead liner panels 98 can be altered to adjust the strength of the cooling jet though the impingement holes.

The first multiple of cooling impingement passages 120 and the second multiple of cooling impingement passages 124 thus facilitate address of the high thermal gradients on the bulkhead liner panels 98. Further, the first multiple of cooling impingement passages 120 and the second multiple of cooling impingement passages 124 can be tailored as a response to non-uniform heat transfer rates inside the combustor chamber in order to achieve an isothermal design.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A bulkhead assembly for a combustor of a gas turbine engine, the bulkhead assembly comprising:
    a bulkhead support shell with a multiple of swirler openings;
    each of the multiple of swirler openings surrounded by a first multiple of cooling impingement passages that define an angle α with respect to a hot side of the bulkhead support shell and a second multiple of cooling impingement passages that define an angle β with respect to the hot side of the bulkhead support shell, wherein the angle α is different than the angle β;
    wherein the angle α is ninety degrees with respect to the hot side of the bulkhead support shell.

2. The bulkhead assembly as recited in claim 1, wherein the first multiple of cooling impingement passages and the second multiple of cooling impingement passages define a ring around each of the multiple of swirler openings.

3. The bulkhead assembly as recited in claim 1, wherein at least one of the first multiple of cooling impingement passages alternate with every one of the second multiple of cooling impingement passages.

4. The bulkhead assembly as recited in claim 1, wherein every one of the first multiple of cooling impingement passages alternate with at least one of the second multiple of cooling impingement passages.

5. The bulkhead assembly as recited in claim 1, wherein every one of the first multiple of cooling impingement passages alternate with every one of the second multiple of cooling impingement passages.

6. The bulkhead assembly as recited in claim 1, further comprising:
    a multiple of bulkhead liner panels mounted to the bulkhead support shell;
    each of the multiple of bulkhead liner panels including a circular rail that interfaces with the bulkhead support shell around the each of the multiple of swirler openings to define an inner corner, wherein a first of the second multiple of cooling impingement passages is directed toward the inner corner.

7. The bulkhead assembly as recited in claim 6, further comprising:
    a mid-rail that interfaces with the circular rail;
    wherein a second of the second multiple of cooling impingement passages is directed toward the inner corner, and wherein the first of the second multiple of cooling impingement passages and the second of the second multiple of cooling impingement passages are disposed on opposing sides of the mid-rail.

8. The bulkhead assembly as recited in claim 1, further comprising:
    a liner panel;
    wherein a first of the second multiple of cooling impingement passages is directed toward an inner corner of the liner panel such that a centerline of the first of the second multiple of cooling impingement passages is coincident with the inner corner.

9. A bulkhead assembly for a combustor of a gas turbine engine, the bulkhead assembly comprising:
    a bulkhead support shell with a multiple of swirler openings, each of the multiple of swirler openings surrounded by a first multiple of cooling impingement passages and a second multiple of cooling impingement passages; and
    a multiple of bulkhead liner panels mounted to the bulkhead support shell, each of the multiple of bulkhead liner panels including a circular rail that interfaces with the bulkhead support shell around each of the multiple of swirler openings to define an inner corner, wherein a first of the second multiple of cooling impingement passages is directed toward the inner corner such that a centerline of the first of the second multiple of cooling impingement passages is coincident with the inner corner;
    wherein the first multiple of cooling impingement passages define an angle α with respect to a hot side of the bulkhead support shell and the second multiple of cooling impingement passages that define an angle β with respect to the hot side of the bulkhead support shell, and wherein the angle α is different than the angle β; and
    wherein the angle α is ninety degrees with respect to the hot side of the bulkhead support shell.

10. The bulkhead assembly as recited in claim 9, wherein the first multiple of cooling impingement passages and the second multiple of cooling impingement passages define a ring around each of the multiple of swirler openings.

11. The bulkhead assembly as recited in claim 10, wherein at least one of the first multiple of cooling impingement passages alternate with every one of the second multiple of cooling impingement passages.

12. The bulkhead assembly as recited in claim 10, wherein every one of the first multiple of cooling impingement passages alternate with at least one of the second multiple of cooling impingement passages.

13. The bulkhead assembly as recited in claim 10, wherein every one of the first multiple of cooling impingement passages alternate with every one of the second multiple of cooling impingement passages.

14. The bulkhead assembly as recited in claim 9, further comprising:
    a mid-rail that interfaces with the circular rail;
    wherein a second of the second multiple of cooling impingement passages is directed toward the inner corner, and wherein the first of the second multiple of cooling impingement passages and the second of the second multiple of cooling impingement passages are disposed on opposing sides of the mid-rail.

* * * * *